(12) United States Patent
Lu et al.

(10) Patent No.: US 9,746,591 B2
(45) Date of Patent: Aug. 29, 2017

(54) MULTI-LAYER MICROPRISMATIC RETROREFLECTIVE SHEETING AND METHOD OF MANUFACTURING THE SAME

(71) Applicant: Aura Optical Systems, LP, Fort Worth, TX (US)

(72) Inventors: Siyao Lu, Fort Worth, TX (US); Drew Buoni, Fort Worth, TX (US); Wenyu Lu, Fort Worth, TX (US); Jutao Lu, Fort Worth, TX (US)

(73) Assignee: Aura Optical Systems, LP, Fort Worth, TX (US)

( * ) Notice: Subject to any disclaimer, the term of this patent is extended or adjusted under 35 U.S.C. 154(b) by 235 days.

(21) Appl. No.: 14/200,373

(22) Filed: Mar. 7, 2014

(65) Prior Publication Data

US 2014/0268337 A1   Sep. 18, 2014

Related U.S. Application Data

(60) Provisional application No. 61/777,608, filed on Mar. 12, 2013.

(51) Int. Cl.
*G02B 5/124* (2006.01)
*B32B 37/16* (2006.01)
(Continued)

(52) U.S. Cl.
CPC ............... *G02B 5/124* (2013.01); *B32B 37/16* (2013.01); *B32B 38/06* (2013.01); *G02B 5/045* (2013.01);
(Continued)

(58) Field of Classification Search
CPC ........ G02B 5/124; G02B 5/045; Y10T 156/10; B29C 47/0021; B29C 47/0064; B29C 47/065; B32B 2307/416; B32B 2307/54; B32B 2307/558; B32B 37/1027; B32B 37/16; B32B 37/203; B32B 38/06
(Continued)

(56) References Cited

U.S. PATENT DOCUMENTS 5,387,458 A * 2/1995 Pavelka .................... B44F 1/04
359/361
6,514,594 B1   2/2003 Wei et al.
(Continued)

FOREIGN PATENT DOCUMENTS

WO      0125361 A1    4/2001
WO     03093007 A1   11/2003

OTHER PUBLICATIONS

International Search Report and the Written Opinion dated Jun. 20, 2014, Application No. PCT/US2014/022619, Applicant: Aura Optical Systems, LP, 11 pages.

*Primary Examiner* — James Phan
(74) *Attorney, Agent, or Firm* — Parker Justiss, P.C.

(57) ABSTRACT

A multi-layer microprismatic retroreflective film and a method of manufacturing the same. In one embodiment, the film includes: (1) a prism layer including an acrylic polymeric material and containing microprisms, (2) a strengthening layer including a polymeric material different from the acrylic polymeric material and (3) a buffer section including acrylic polymeric material located between the microprisms of the prism layer and the strengthening layer.

29 Claims, 5 Drawing Sheets

(51) Int. Cl.
*G02B 5/04* (2006.01)
*B32B 38/06* (2006.01)
*B29C 47/00* (2006.01)
*B32B 37/00* (2006.01)
*B32B 37/10* (2006.01)
*B32B 37/20* (2006.01)
*B32B 37/24* (2006.01)
*B29C 47/06* (2006.01)

(52) U.S. Cl.
CPC ...... *B29C 47/0021* (2013.01); *B29C 47/0064* (2013.01); *B29C 47/065* (2013.01); *B32B 37/0046* (2013.01); *B32B 37/1027* (2013.01); *B32B 37/203* (2013.01); *B32B 2037/243* (2013.01); *B32B 2307/416* (2013.01); *B32B 2307/54* (2013.01); *B32B 2307/558* (2013.01); *Y10T 156/10* (2015.01)

(58) Field of Classification Search
USPC .......... 359/529–533, 546–552, 900; 156/60, 156/244.11
See application file for complete search history.

(56) References Cited

U.S. PATENT DOCUMENTS

2007/0242357 A1* 10/2007 Thakkar ................. G02B 5/124
 359/530
2010/0290119 A1* 11/2010 Wei ......................... B32B 27/18
 359/530

\* cited by examiner

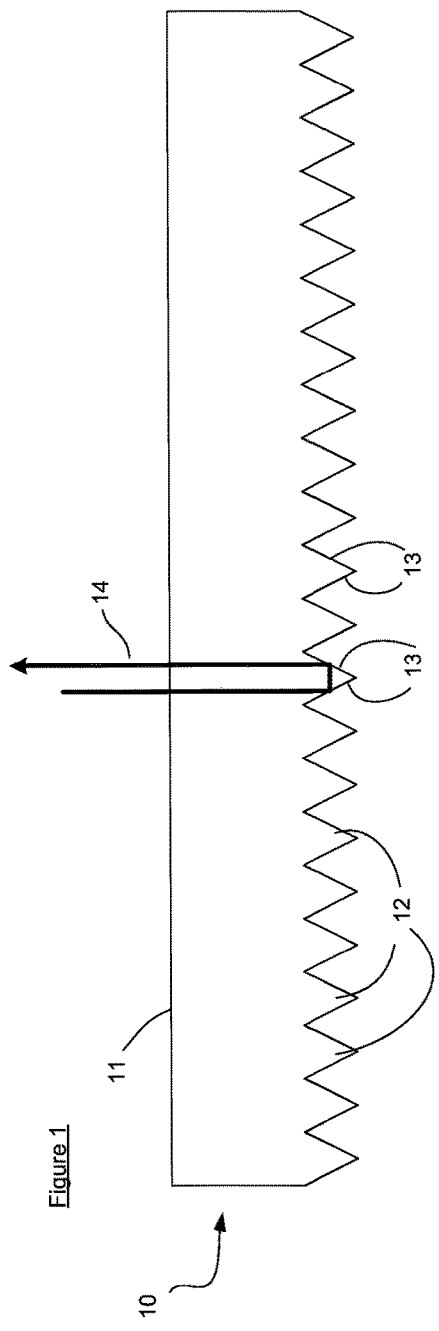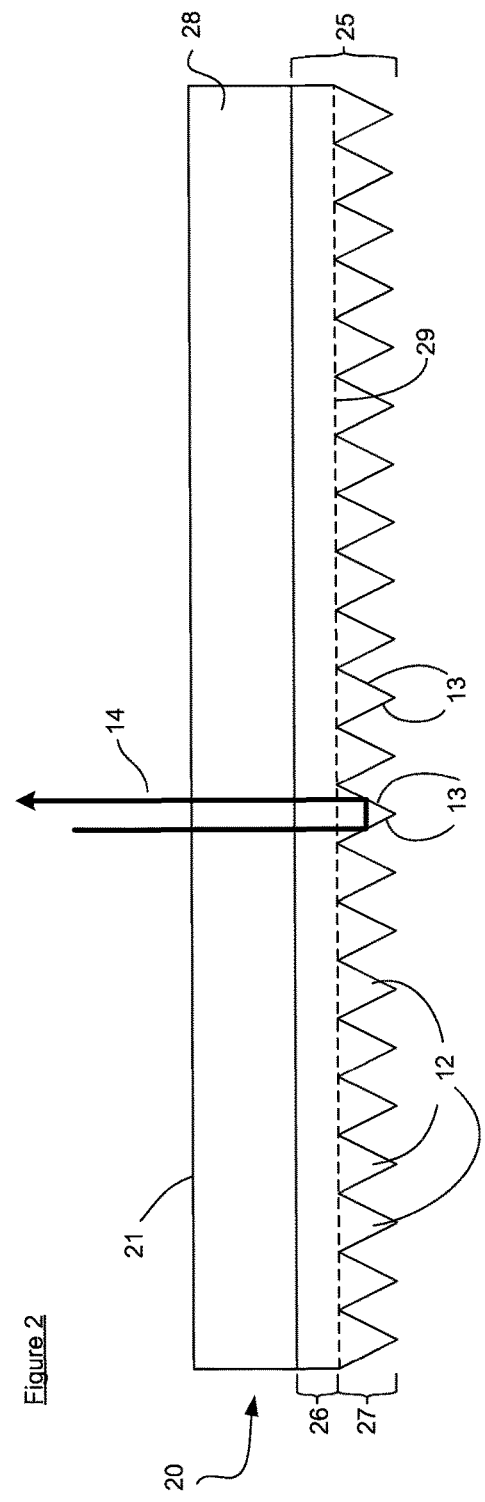

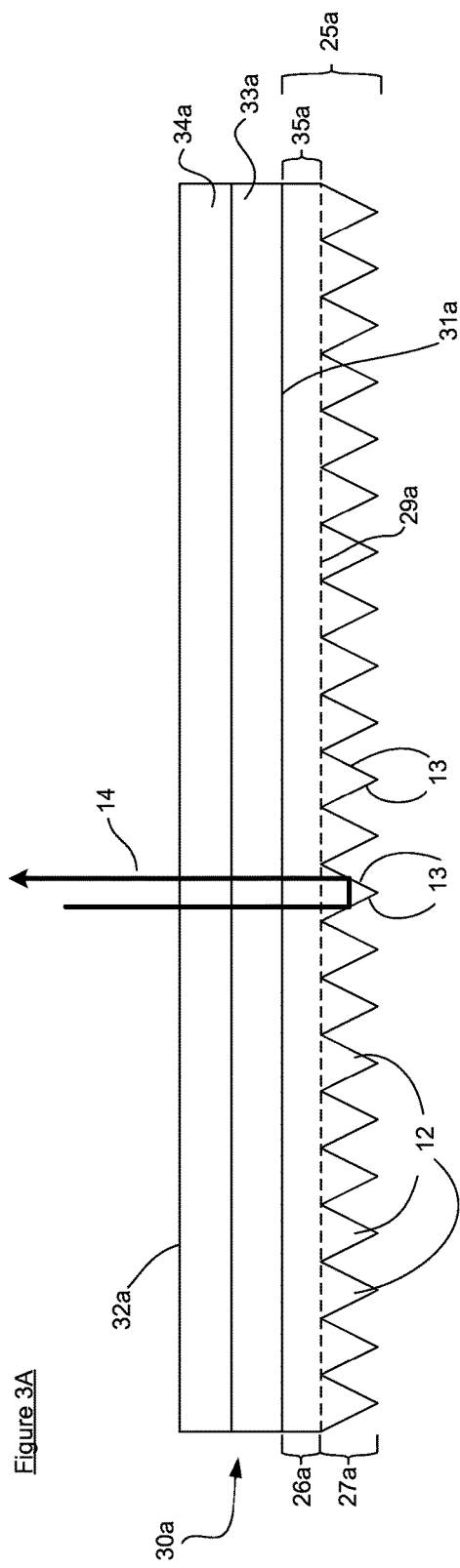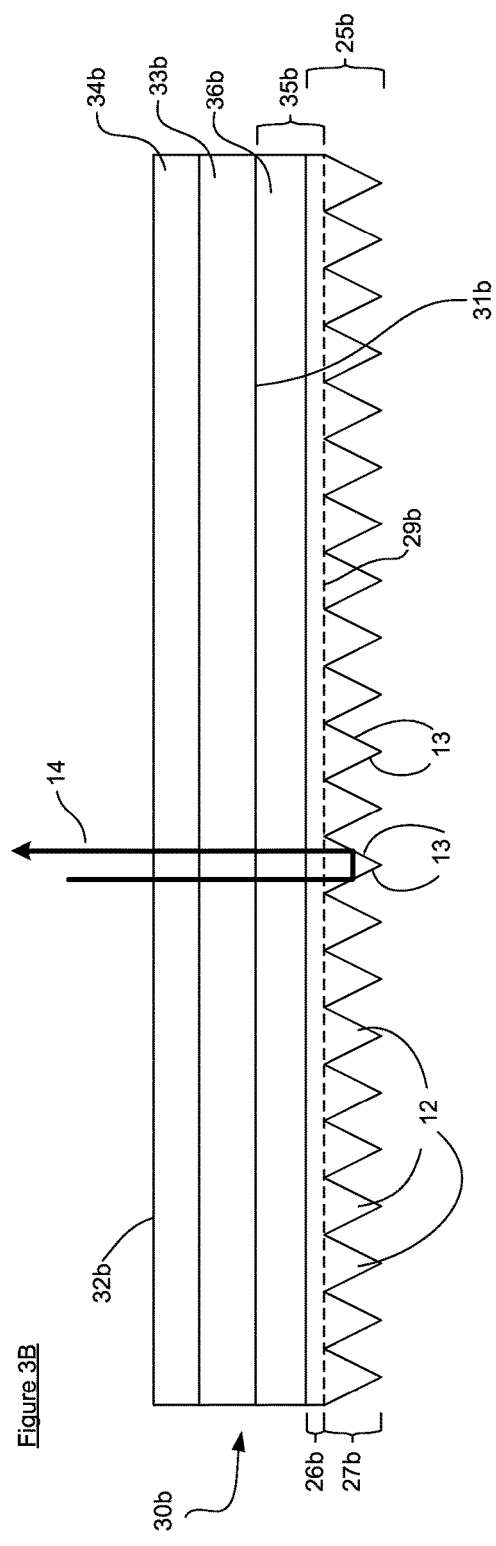

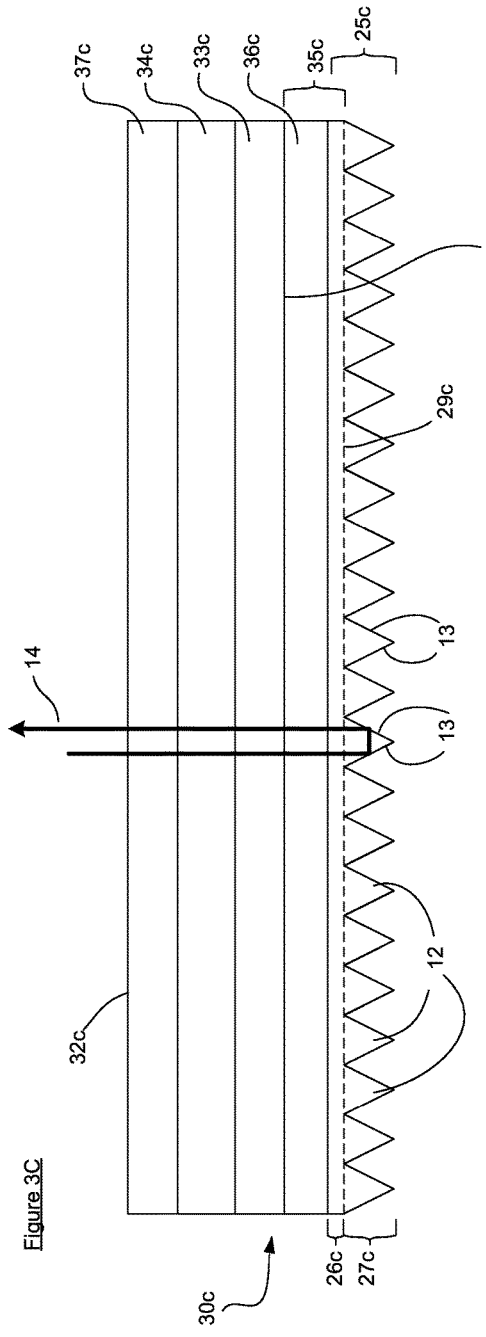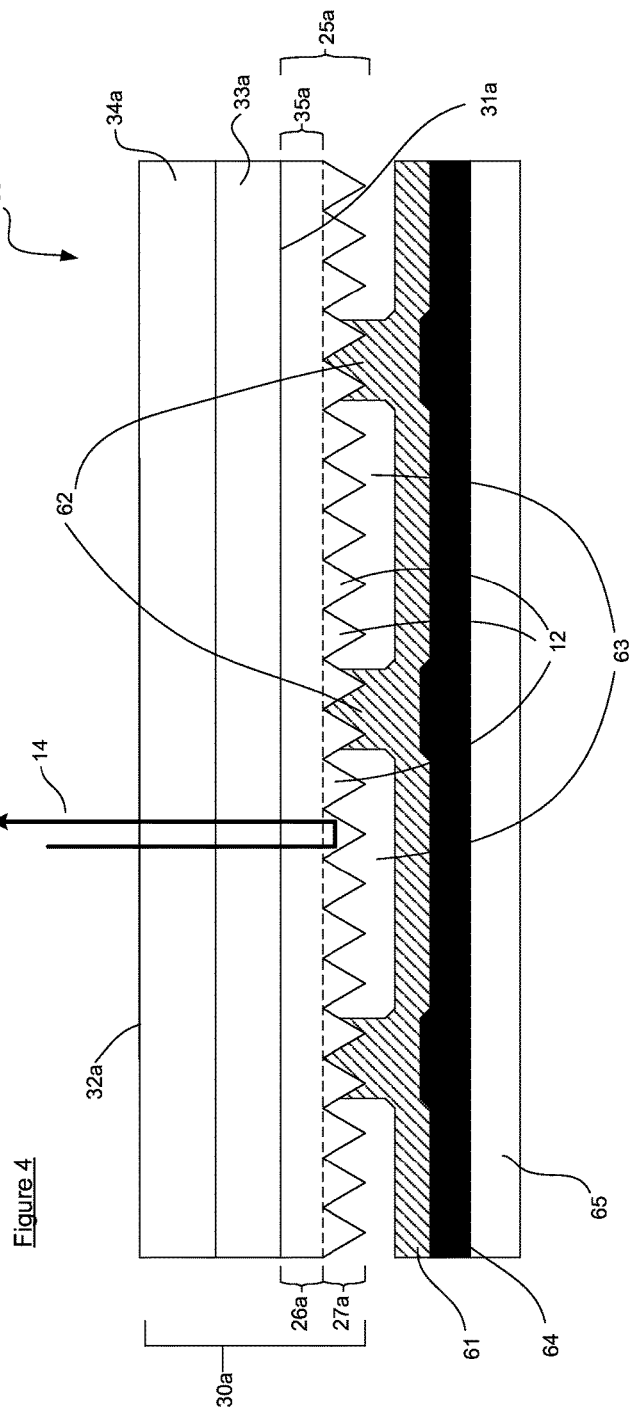

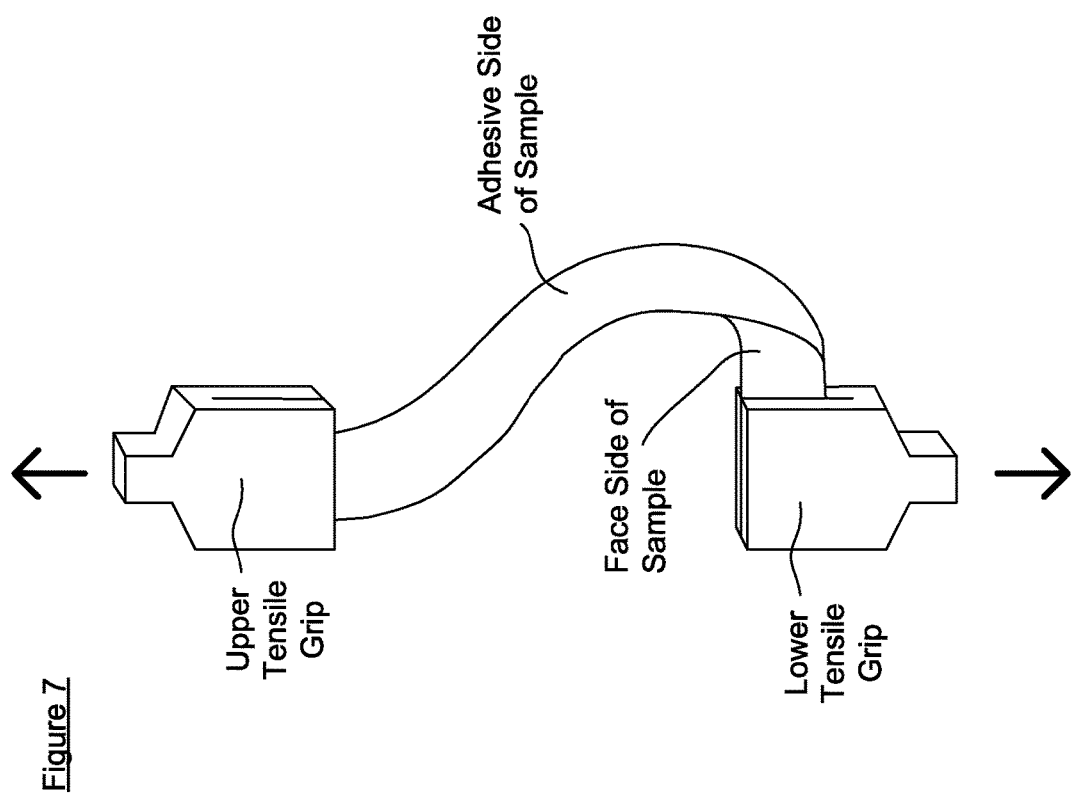

MULTI-LAYER MICROPRISMATIC RETROREFLECTIVE SHEETING AND METHOD OF MANUFACTURING THE SAME

CROSS-REFERENCE TO RELATED APPLICATION

This application claims the benefit of U.S. Provisional Application Ser. No. 61/777,608, filed by Lu, et al., on Mar. 12, 2013, entitled "Multi-Layer Microprismatic Retroreflective Sheeting," commonly assigned with this application and incorporated herein by reference.

TECHNICAL FIELD

The disclosure is directed to a retroreflective film and a method of manufacturing such film.

BACKGROUND

As known in the art, microprismatic retroreflective film (also known as retroreflective sheeting or reflective film) generally consists of a plastic film containing many microscopic cube corner retroreflective elements (also known as either microprismatic retroreflective elements or microprisms). These retroreflective elements have three mutually substantially perpendicular lateral faces, which intersect at a single point, or apex. These cube corner retroreflective elements operate to return impinging light towards its source. Light enters each cube corner retroreflective element and is then reflected from each of the three lateral faces to return towards its source. Such microprisms are generally shaped like a tetrahedron, but also exist in truncated versions, known in the art as full-cube microprisms.

Reflection from the three lateral faces occurs either through specular reflection or total internal reflection. With specular reflection, the cube corner retroreflective elements are coated with a reflective material, such as either aluminum or silver, as is the case with metalized microprismatic retroreflective film. With total internal reflection, the cube corner retroreflective elements have not been coated with a reflective material, but instead are governed by Snell's Law where any light impinging on one of the lateral faces passes through the face unless it strikes the face at an angle less than its critical angle, in which case the light is reflected. Encapsulated microprismatic reflective film is one such retroreflective film construction where the microprisms operate through the principles of total internal reflection. Regardless of whether the microprisms function through total internal reflection or specular reflection, the tolerances on the microprisms must be tightly controlled to ensure that the lateral faces are substantially perpendicular to each other. Even minor deviations in the dihedral angles between the lateral faces from 90° can cause a substantial change in the retroreflective properties. Both encapsulated microprismatic reflective films and metalized microprismatic reflective films are commonly supplied with an adhesive backing to allow for application on sign faces or other substrates.

A cross-sectional diagram of the well-known microprismatic retroreflective film structure is shown in FIG. 1. Microprismatic retroreflective film 10 is made from a light-transmissive polymeric material and consists of a smooth outer-surface 11 and microprismatic retroreflective cube corner elements 12. Light impinging on the outer-surface 11 passes through the film to be reflected by the lateral faces 13 of the microprisms 12 and returned towards the source of the light as depicted by arrow 14.

Although FIG. 1 depicts the retroreflective film as a single layer of polymeric material, in practice most microprismatic reflective sheeting materials available on the market today consist of two or more layers of polymeric materials. For example, FIG. 2 shows the cross-section of a microprismatic retroreflective film 20 with two different polymeric layers. The first polymeric layer is known as the prism layer 25, which is a light-transmissive polymeric layer containing the microprisms 12. The second polymeric layer is the body layer 28. In this example, the outer surface 21 is part of the body layer 28, and the body layer 28 also functions as the outer surface layer of the retroreflective film construction. Although the prism layer 25 is made from a single layer of polymeric material, it can further be categorized into two different sections. The portion of the prism layer 25 above the base of the microprisms (as depicted by dashed line 29) can be defined as the land section 26 of the prism layer 25. The portion of the prism layer 25 consisting of the microprisms 12 can be defined as the prism section 27 of the of the prism layer 25. As such, the height of the microprisms 12 equals the thickness of prism section 27.

The reason for multiple layers in certain retroreflective film constructions is that each layer performs a different function to balance end-use performance and application properties against manufacturing considerations and raw material costs. For example, it may be desirable for a body layer to provide ultraviolet (UV)-light screening functions to enhance the overall durability and weatherability of the microprismatic sheeting. Such UV-light screening layers may protect underlying polymeric layers, any pigments or colorants, or any printed graphics or other printed images that may be printed on a lower layer. For example, Pavelka, et al., U.S. Pat. No. 5,387,458 outlines the use of protective UV-light screening layers to protect fluorescent colorants in a lower layer. As another example, to create a flexible microprismatic retroreflective construction, a two-layer construction is commonly used where the body layer is made from a flexible polymeric material and the prism layer is made from a rigid polymeric material. Such microprismatic constructions are discussed in Smith, et al., U.S. Pat. No. 5,450,235.

Generally speaking, it is preferable for the prism layer to be made from a rigid polymeric material, such as acrylic, polyester, or polycarbonate. This ensures that the precise dimensions of the microprisms can be maintained to maximize levels of retroreflection. If the microprisms were formed from a soft or flexible polymer, such as flexible polyurethane or plasticized polyvinyl chloride, the shape of the microprisms could be easily distorted and the levels of retroreflection could be greatly diminished.

One advantageous material to use as the prism layer is acrylic, such as polymethyl methacrylate acrylic. There are several reasons for this. First, it has lower processing temperatures (compared with other rigid polymers such as polycarbonate or polyester) and the microprisms can therefore be more easily formed into the prism layer. Further, compared to other polymeric materials such as polycarbonate, acrylic is less hydroscopic in nature and therefore less prone to generating moisture bubbles or similar defects during the molding or forming of the microprisms into the prism layer. Further, acrylic is generally a weatherable and durable polymeric material. Further, it appears to metalize more easily compared with other polymeric materials to provide a brighter metallic finish when used in metalized microprismatic retroreflective sheeting materials.

For microprismatic sheeting expected to last for an extended time frame in outdoor environments, it is also preferred to use acrylic polymeric materials, such as polymethyl methacrylate, as the outer surface layer. As mentioned above, acrylic polymers are naturally weatherable. The use of acrylic materials as the outer surface layer of the reflective film can prolong outdoor life of the film since acrylic polymers generally do not yellow, chalk, or haze over time as rapidly as do other polymeric materials. Such materials can further provide a UV-light screening functionality by blending UV-light absorbing additives (such benzophenone or benzotriazole additives) into this outer surface acrylic layer. Further, compared with other durable polymers, such as polyvinylidene fluoride polymers, acrylic is often more cost effective.

However, there are downsides to the use of acrylic materials. Acrylics can be relatively brittle compared to other polymeric materials. This can be true even when the acrylic polymers are impact-modified acrylic polymers. Microprismatic sheeting made from only acrylic polymers can easily crack upon impact or can easily snap or break when flexed. In some instances, the relatively brittle nature of acrylic polymers may create problems during application of the reflective sheeting. For example, if a strip of adhesive-backed reflective film is misaligned during application, microprismatic reflective film made from only acrylic polymers may crack or tear when being repositioned to correct the misalignment.

The relatively brittle nature of many acrylic materials can be further characterized by the Notched Izod impact strength of the polymers as measured by ASTM D256 at 23° C. For example, a typical polymethyl methacrylate acrylic polymer has a Notched Izod impact strength of about 15-20 J/m. Moreover, many impact-modified polymethyl methacrylate acrylic polymers still have a Notched Izod impact strength only up to about 60 to 70 J/m.

To solve this issue, conventional processes have attempted to substitute other polymeric materials for either the prism layer or the outer surface layer of the product. For example, others have substituted either polycarbonate or polyester polymeric materials as the prism layer. This may solve the brittleness issue as polymers such as polycarbonate are quite strong and impact resistant relative to acrylic. However, as referenced above, such polymers are less desirable to use as the prism layer due to processing considerations or deficiencies in metalizing the retroreflective film.

Others have attempted to solve this issue by incorporating a thin supporting film into the adhesive layer of adhesive-backed reflective films. For example, the retroreflective microprismatic body of the Avery Dennison V-5720 Conspicuity Tape product is believed to be made from only acrylic polymers. However, to solve this brittleness issue, the adhesive supplied with the product contains a thin polyester supporting film in the middle of the adhesive. Unfortunately, the retroreflective microprismatic body of this product is still prone to cracking and breaking, and such adhesive systems incorporating a supporting film can be more expensive to manufacture.

SUMMARY

One aspect provides a multi-layer microprismatic retroreflective film. In one embodiment, the film includes: (1) a prism layer including an acrylic polymeric material and containing microprisms, (2) a strengthening layer including a polymeric material different from the acrylic polymeric material and (3) a buffer section including acrylic polymeric material located between the microprisms of the prism layer and the strengthening layer.

Another aspect provides a method of manufacturing a multi-layer microprismatic retroreflective film. In one embodiment, the method includes: (1) forming a prism layer containing microprisms from an acrylic polymeric material, (2) separately forming a first laminating film including a strengthening layer having a polymeric material different from the acrylic polymeric material and (3) bonding the first laminating film to the prism layer, the bonding forming a buffer section having acrylic polymeric material between the microprisms and the strengthening layer.

BRIEF DESCRIPTION

Reference is now made to the following descriptions taken in conjunction with the accompanying drawings, in which:

FIG. 1 illustrates a cross-sectional diagram of the conventional microprismatic retroreflective film structure;

FIG. 2 illustrates a cross-section of a microprismatic retroreflective film having two different polymeric layers;

FIGS. 3A-3C illustrate various embodiments of the present disclosure that incorporate the strengthening layer;

FIG. 4 illustrates an encapsulated microprismatic retroreflective film of the present disclosure incorporating the multi-layer retroreflective film of FIG. 3A;

FIG. 7 illustrates a test method to analyze the tear resistance of retroreflective film.

DETAILED DESCRIPTION

Figure 5:
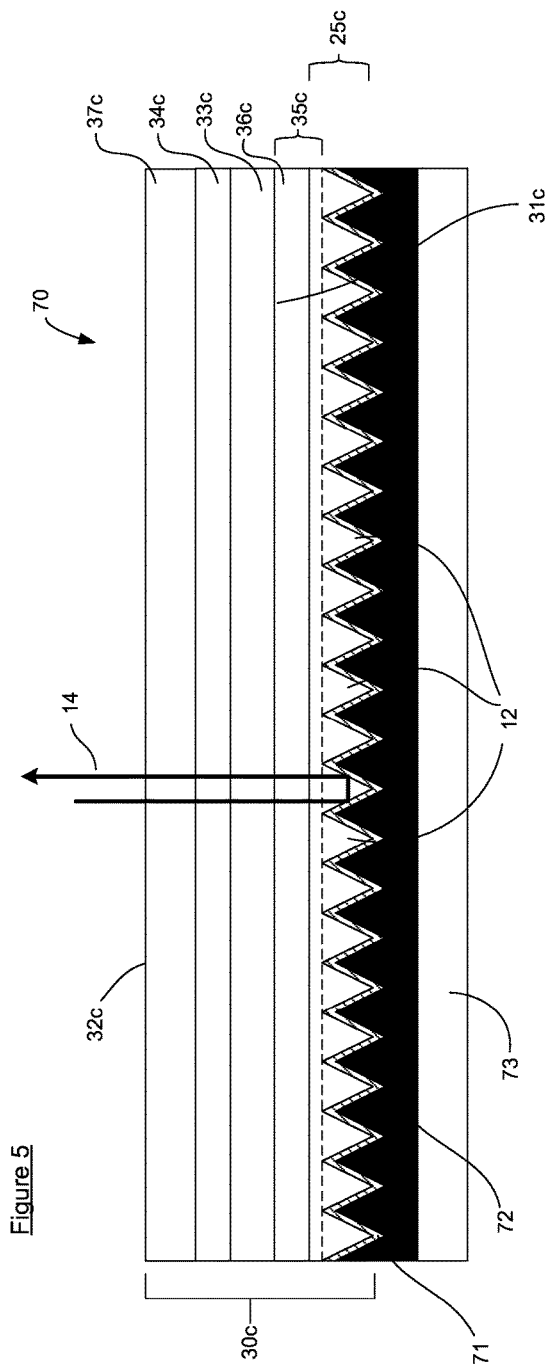
FIG. 5 illustrates a metalized microprismatic retroreflective film of the present disclosure incorporating the multi-layer retroreflective film of FIG. 3C.

The present disclosure provides a novel microprismatic reflective film structure to allow acrylic polymers to be used in both the prism layer and outer surface layer (or upper body layer) while still addressing the brittleness issues associated with all acrylic microprismatic retroreflective films.

One embodiment of the disclosure is shown in FIG. 3A. It consists of prism layer 25a made from acrylic polymers; strengthening layer 33a made from a polymer other than acrylic to improve the strength and impact resistance of the retroreflective sheeting; and an upper body layer 34a also comprising acrylic polymers. Additionally, FIG. 3A contains a buffer section 35a.

Another embodiment of the disclosure is shown in FIG. 3B. It contains prism layer 25b, strengthening layer 33b, and upper body layer 34b. However, the embodiment also contains lower body layer 36b, which is also made from acrylic. In this embodiment, the buffer section 35b encompasses both the land section 26b and the lower body layer 36b.

In each embodiment, the buffer section 35 is defined as the section extending from the base of the microprisms (as depicted as dashed line 29 in the FIGs.) to the lower interface 31 between the lower acrylic layers and the strengthening layer 33.

The strengthening layer 33 acts to improve the overall mechanical properties to make the resulting retroreflective film structure significantly stronger and less brittle. Preferred polymeric materials for strengthening layer 33 have mechanical properties (such as tensile strength, impact strength, flexural strength, flexural modulus, tear strength, or tear resistance properties) greater than acrylic. In certain embodiments, the polymeric material of the strengthening layer has a Notched Izod impact strength of 100 J/m greater than that of the acrylic polymeric material of the prism layer. Preferably, the strengthening layer has an Izod notched impact strength of 400 J/m greater than that of the acrylic prism layer. In other embodiments, the strengthening layer has a tensile strength of 2,000 psi greater than that of the acrylic polymers in the prism layer. Preferably, greater than 3,500 psi compared with the prism layer. Tensile strength of films can be measured according to ASTM D638. In other embodiments, the strengthening layer has both a Notched Izod impact strength of 400 J/m greater than that of the acrylic polymeric material of the prism layer and a tensile strength of 2,000 psi greater than the acrylic of the prism layer.

Such multi-layer constructions have historically created manufacturing challenges. As known in the art, if two or more polymers having different refractive indexes are blended together, the resulting mixture may appear hazy or cloudy even if the polymers are individually highly clear and transparent. Such an internal haze can be especially problematic in retroreflective film because the haze can cause light impinging on the retroreflective microprisms to be scattered in an undesirable pattern and thereby decrease the retroreflectivity. In many microprismatic film manufacturing operations, the act of molding or forming the microprisms into the prism layer can cause other layers to mix together, especially at the interface between different layers. Thus, to minimize this effect in the present disclosure, if the refractive index of the strengthening layer is different than approximately 1.49, which is approximately the refractive index of most acrylic materials, then the strengthening layer should also have thermal properties significantly higher than the acrylic materials of the buffer section. This is a critical feature of the invention to prevent undesirable mixing between the different layers of polymeric materials with different refractive indices. If the strengthening layer has higher thermal properties compared to the surrounding acrylic, the probability of any undesirable polymeric mixing between the layers is reduced as the strengthening layer will not soften or melt or flow to the same degree as the surrounding polymeric materials, and therefore, any potential mixing between the layers can be minimized. As such, in one embodiment of the disclosure, the polymeric material of the strengthening layer has a Vicat softening point at least 20° F. greater than the acrylic of the buffer section adjacent to the strengthening layer of the construction. More preferably, the Vicat softening point differential is at least 50° F. or more. The Vicat softening point can be determined by the ASTM D1525 test method using a load of 50N and a heating rate of 50° C. per hour.

Any light-transmissive polymeric material with improved mechanical properties can be used as the strengthening layer provided that the Vicat softening point of the material is sufficiently higher than that of the acrylic in the buffer section if the polymer has a different refractive index than that of the acrylic in the buffer section. Ideal polymeric materials for the strengthening layer include polycarbonates; polyesters; copolyesters, including glycol-modified polycyclohexylenedimethylene terephthalate (PCTG) and glycol-modified polyethylene terephthalate (PETG) copolyesters; polyarylates and polyarylate blends; polyvinyl chloride; fluoropolymers, such as polyvinylidene fluoride; polyamides; polysulfones; and mixtures of the above polymers, such as a blend or polyester and polycarbonate; and other light transmissible polymeric materials. Polycarbonate is an advantageous polymeric material due to its high level of impact resistance, high tensile strength, and high Vicat softening point.

However, to prevent this undesirable mixing between polymers with different refractive indexes, beyond suitable thermal properties of the polymers in the strengthening layer 33, the construction must also contain an acrylic buffer section having an acceptable thickness. Buffering section 25 functions as a buffering layer between the prism section 27 of the prism layer 25 and the strengthening layer 33 to prevent any undesirable mixing of acrylic polymers with the different polymers of the strengthening layer 33. In many common retroreflective sheeting manufacturing operations, the microprisms are first molded into the prism layer and then one or more additional layers are laminated onto the prism layer at a later stage of the manufacturing process while the prism layer polymer is still in a heated and softened and flowable form. As a result, as additional layers are laminated onto the prism layer 25, there can be intimate mixing of the polymers at the interface between the layers. However, it has been presently discovered that by incorporating a buffer section with a thickness of at least 50% of the height of the microprisms, any such interlayer polymer mixing can be minimized or substantially eliminated. In certain embodiments, the thickness of the buffer section is at least 75% of the height of the microprisms. In still other embodiments, the thickness of the buffer section is greater than the height of the microprisms. As the microprisms increase in size, more acrylic polymer must melt and flow in order to form the microprisms. As most of the flow and movement of the acrylic occurs near the microprisms, the thickness of the buffer section must be increased to off-set the increase of acrylic material that must be softened to flow and to form the microprisms. Without being bound by any particular theory, it is believed that that a thicker buffer section allows the acrylic in the land section and/or the lower body layer to spread out and flow parallel to the interface with the strengthening layer without substantially mixing with it. However, if the buffer section is too thin, the acrylic becomes mixed with the strengthening layer because there is nowhere else for the acrylic to flow during lamination of the strengthening layer onto the prism layer.

In other embodiments of this invention, the thickness of the buffer section can be minimized by providing a portion of the buffer section as a lower body layer as opposed to having the buffer section consist entirely of the land section of the prism layer. The benefit of separately incorporating a lower body layer is that it can be laminated to the prism layer at the same time as the strengthening layer. Since the heat of the prism layer will first soften and melt the lower body layer, the possibility of interlayer polymeric mixing between the buffer section and the strengthening layer can be further reduced.

The prism layer and the lower body layer need not consist of exactly the same acrylic polymers. For example, the prism layer and the lower body layer can be made from two different impact-modified polymethyl methacrylate acrylics where the levels of impact modifiers are different within each acrylic. Alternatively, it may be desirable to use a high flow grade of acrylic as the prism layer to allow for easier forming of the microprisms and a lower flow grade as the lower body layer to assist in minimizing any potential interlayer mixing with the strengthening layer. Cost reasons, availability of raw materials, or other reasons may also dictate using different acrylic materials in the prism layer and lower body layer.

The acrylic upper body layer 34 functions as a weatherable outer surface layer to allow the retroreflective film to be used in outdoor environments. In some embodiments, the acrylic upper body layer also contains UV-light absorbing and/or UV-light stabilizing additives or other additives to further enhance the durability of the retroreflective film. In other embodiments, the acrylic of the upper body layer can be blended with other polymers (such as polyvinylidene fluoride or other fluoropolymers) to enhance certain performance properties, Of course, as discussed above, care must be taken to ensure that any such blending does not result in an internal haze or cloudiness.

FIG. 3C shows still another embodiment of this disclosure containing prism layer 25c, lower body layer 36c, strengthening layer 33c, and upper body layer 34c. As with FIG. 3B, the buffer section 35c includes both land section 26c and the lower body layer 36c. However, this construction also provides for an optional cover layer 37c added above the upper body layer 34c. This optional cover layer 37c may provide additional performance features to the reflective sheeting construction, such as scratch resistance or dew resistance or graffiti protection. In other embodiments, the cover layer 37c may consist of an additional layer of acrylic polymer to further enhance the durability of the retroreflective sheeting.

Beyond simply improving the strength, tear resistance and other mechanical properties of the resulting microprismatic retroreflective film compared with an all acrylic retroreflective structure, another benefit of the present disclosure is that it improves the observation angularity of the retroreflective sheeting at observation angles above about 0.3°. Observation angularity is defined as the level of retroreflectivity that occurs when a slight off-set angle exists between the light impinging on face of the reflective film and the eye of the viewer of the retroreflective film. For example, the eye of the driver of an automobile is slightly off-set from the headlights of the automobile. Test Method ASTM E-810-10 provides a detailed technical definition of observation angle.

This improvement in observation angularity is particularly useful for metalized microprismatic reflective film, which often have lower levels of retroreflection at larger observation angles such as 0.33° or 0.5° when compared with encapsulated microprismatic films. Without being bound by any particular theory, it is believed that the refraction of light as it passes through the multiple polymeric layers with different refractive indexes creates a slight divergence effect as the light is retroreflected (back) towards the source, which thereby enhances the observation angularity. Thus, the observation angularity of a microprismatic retroreflective sheeting can be tailored for specific applications by varying the refractive index and/or the thickness of the strengthening layer The novel retroreflective films of the present disclosure can be manufactured by any suitable manufacturing process where the microprisms are initially formed into the acrylic prism layer, and then, during a subsequent step in the manufacturing process, the additional layers and optional cover layer are laminated or otherwise bonded to the acrylic prism layer. Such useful manufacturing processes include embossing of preformed films into a molding tool (such as processes disclosed Buoni, et al., U.S. Pat. No. 6,375,776 B1, incorporated herein by reference), casting a fluid material into a molding tool (such as processes disclosed in Rowland, U.S. Pat. No. 3,689,346, incorporated by herein by reference), extrusion embossing (such as the process defined in Mimura, et al., U.S. Pat. No. 5,945,024, incorporated herein by reference), electrodeposition of polymeric powders into a molding tool (such as the process outlined in Pricone, U.S. Pat. No. 8,226,880 B1, incorporated herein by reference), or other known manufacturing techniques. Regardless of the manufacturing process, it is generally preferred to form the microprisms fully before adding any additional layers. If other layers are laminated to the construction while the microprisms are still being molded and formed, the possibility of interlayer mixing between different polymers increases.

Useful molding tools for manufacturing the retroreflective sheeting include discrete molding panels or continuous belts. Such tools may be formed by following a replication process in which an optical master containing the microprisms is repeatedly replicated and then the replicated copies are assembled together to form a larger tool or molding belt. The microprisms on the optical master may be formed by direct precision machining, such as through a diamond turning or diamond ruling process. Replicated copies may be made through electroforming processes, such a electrolytic nickel deposition, and then assembled together through laser welding or other known assembly techniques. An example of such a replication and precision assembly process is outlined in Pricone, et al., U.S. Pat. No. 4,478,769, which is incorporated herein by reference.

In certain manufacturing processes, all or some of the different laminating layers are previously coextruded into a single composite film consisting of the different polymeric materials before being provided for bonding to the acrylic prism layer. The benefit of coextruding these layers is to lower manufacturing costs and to simplify the overall manufacturing process by reducing the total number of films required to be handled. During coextrusion, it is important to ensure that the different polymeric materials do not mix together to create the internal haze referenced above. As known in the industry, this can be accomplished by using a highly polished die block on the coextrusion line while maintaining separation and good temperature control between the different polymer layers until the lamination point near the exit of the coextrusion die.

After manufacturing the multi-layer retroreflective film as depicted in FIG. 3A, 3B, or 3C, additional processing steps can be taken to manufacture an encapsulated microprismatic retroreflective film or a metalized microprismatic retroreflective film, as shown in FIGS. 4 and 5.

FIG. 4 depicts an encapsulated microprismatic retroreflective film 60 of the present disclosure incorporating the multi-layer retroreflective film 30a of FIG. 3A. Retroreflective film 30a is bonded to backing film 61 through a series of interconnecting bridges 62. Thus, the microprismatic retroreflective elements 12 are then encapsulated in air cells 63. Adhesive layer 64 is provided on the underside of backing film 61 with release liner 65, which can be removed from the adhesive 64 prior to application. The microprisms of encapsulated microprismatic retroreflective film 60 operate through the principles of total internal reflection.

FIG. 5 depicts a metalized microprismatic retroreflective film 70 of the present disclosure incorporating the multi-layer retroreflective film 30c. Here, the cube corner retroreflective elements 12 of retroreflective film 30c have been coated with a reflective coating 71. Adhesive layer 72 is the provided on the underside of reflective coating 71 with release liner 73, which can be removed from the adhesive 72 prior to application. Here, the microprisms function through the principles of specular reflection. The reflective coating is commonly applied through vacuum metallization or similar processes and is typically a metallic coating of either aluminum, silver, or nickel.

In variations of the disclosure, any of the layers can be dyed, pigmented, or otherwise colored. Additionally, one or more of the layers can be printed with graphics, symbols, words or other designs. Further, any polymer additives, such as UV-light absorbers, UV-light stabilizers, anti-oxidants, plasticizers, impact-modifiers, flame retardants, anti-fungal agents, or other additives, can be incorporated into any of the polymer layers.

Although this discussion primarily has focused on intimately bonding the various layers to the acrylic prism layer, it is also within the scope of the disclosure to laminate one or more of the layers together through the use of adhesives or other bonding materials.

EXAMPLES

Figure 6:
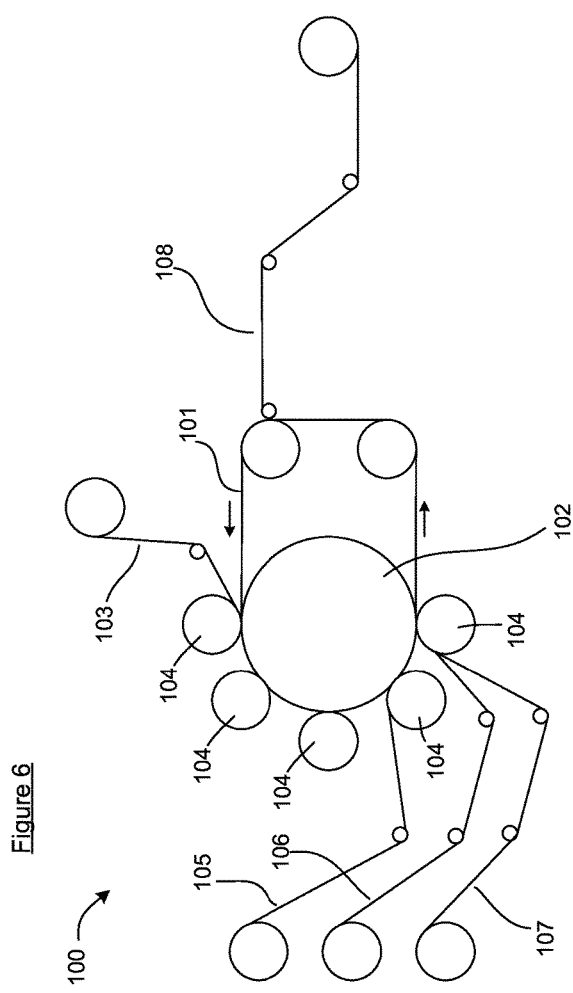
FIG. 6 illustrates a conventional embossing apparatus used to manufacture the embodiments of this disclosure.

Unless otherwise noted, the following manufacturing process was employed using an embossing apparatus 100 as depicted in FIG. 6 to create the examples described below. A rotating molding belt 101 containing microprism molding cavities was continuously rotated over a heating roller 102. In all examples, the microprisms were forward-tilted microprisms as defined in Hoopman, U.S. Pat. No. 4,588,258, incorporated herein by reference, with a prism height of approximately 67 microns and a tilt angle of approximately 6.2°. A 50 micron thick impact-modified acrylic film 103, which was made from Optix CA-1000 resin (commercially available from Plaskolite West, Inc., of Compton, Calif., USA), was fed onto molding belt 101 and the microprisms were then continuously molded into acrylic film 103 through heat and pressure to form the acrylic prism layer with a resulting land section of approximately 28 microns. (Note: Since the microprisms have the shape of a tetrahedron, the amount of acrylic needed to fill the microprism molding cavities can be approximated at approximately ⅓ of the microprism height, which in this example equates to approximately 22 microns.) The pressure was provided by a series of nip pressure rollers 104. A first laminating film layer 105 and a second laminating film 106 were subsequently provided and laminated to the acrylic prism layer using additional nip pressure rollers 104 while the acrylic prism layer film 103 was still engaged with the molding belt 101. In some examples, either of the laminating film layers may have been a coextruded film consisting of multiple polymer layers. A temporary polyester carrier film 107 was laminated onto the outer surface of the film structure. The temporary polyester carrier film 107 functioned as a polishing film to ensure a high-gloss surface was formed on the outer surface of the retroreflective film structure. After cooling the resulting multi-layer retroreflective film structure to substantially below the glass transition temperature of the acrylic polymer used in the acrylic prism layer, retroreflective film 108 was removed from the rotating molding belt 101.

In separate manufacturing steps (which are not shown), a reflective coating was then applied to the acrylic prism layer of retroreflective film 108. The reflective coating consisted of greater than 99.9% purity aluminum and was applied through a vacuum-metalization process. After metallization, a pressure-sensitive adhesive and release liner were applied to the reverse-side of the resulting metalized retroreflective film and temporary polyester carrier 107 was removed from the face of the sheeting.

Example 1A

A first laminating film was prepared through a coextrusion process and consisted of three different polymeric layers. The total thickness of the first laminating film was approximately 150 microns. The lower layer of the first laminating film was approximately 37 microns thick and accounted for approximately 25% of the total thickness. The lower layer was made from Acrypet MF-001 polymethyl methacrylate acrylic resin (commercially available from Mitsubishi Rayon Co., Ltd., of Tokyo, Japan) and contained 19.5% by weight of an acrylic-rubber impact-modifier additive (EM-600 commercially available from LG Chem, Ltd., of South Korea). This lower layer of the first laminating film became the lower body layer. The middle layer of the first laminating film was approximately 75 microns thick and accounted for approximately 50% of the total thickness. The middle layer was made from Panlite® L-1250Y polycarbonate resin (commercially available from Teijin Kasei America, Inc. of Norcross, Ga.). This middle layer of the first laminating film became the strengthening layer. The upper layer of the first laminating film was also approximately 37 microns thick and likewise accounted for approximately 25% of the total thickness. The upper layer was made using the same acrylic formula as the lower layer of the first laminating film and became the upper body layer of the resulting retroreflective film structure. As listed in the product data sheets from the respective suppliers, the Vicat softening point of the Panlite® L-1250Y polycarbonate is 300° F., and 192° F. is the Vicat softening point for the Acrypet MF-001.

A second laminating film was extruded at 75 microns thickness and was made from Acrypet MF-001 polymethyl methacrylate acrylic resin (commercially available from Mitsubishi Rayon Co., Ltd., of Tokyo, Japan) and contained 18% by weight of an acrylic-rubber impact-modifier additive (EM-600 commercially available from LG Chem, Ltd., of South Korea), 2.0% Tinuvin® 234, 3.0% Tinuvin® 326, and 3.0% Tinuvin® 900. Each of the Tinuvin® additives are UV-light absorbing and UV-light stabilizing additives commercially available from BASF Corporation of Wyandotte, Mich. This second laminating film became a cover layer in the resulting retroreflective sheeting structure.

The resulting metalized retroreflective sheeting possessed the structure of the sheeting depicted in FIG. 5. The buffer section of this construction was approximately 65 microns, which is about 97% of the height of the microprisms. The mechanical properties and thermal properties of the polymers of the prism layer, lower body layer, and strengthening layer are listed in Table 1.

TABLE 1

| | Vicat Softening Point (° F.) | Notched Izod Impact Strength | Tensile Strength (psi) |
| --- | --- | --- | --- |
| Prism Layer: Optix CA-1000 acrylic | 208° F. | 66 J/m | 6,510 psi |
| Lower Body Layer: Acrylpet MF-001 acrylic | 192° F. | N/A | 9,570 psi |
| Strengthening Layer: Panlite L-1250Y polycarbonate | 300° F. | 854 J/m | 11,700 psi |

The Vicat softening point of CA-1000 is estimated at 208° F. for a 50N based upon available data where the Vicat softening point has been measured at 227° F. using a 10N load.

Conventional Construction: Comparative Example 1B

Comparative Example 1B represents a conventional construction containing only acrylic polymers. Comparative Example 1B was prepared in an identical fashion to Example 1A except that the first laminating film consisted of a single-layer extruded film of DR-101 impact-modified acrylic resin (commercially available from Arkema, Inc., of Philadelphia, Pa.) The thickness of this first laminating film was 100 microns.

Upon bending Comparative Example 1B backwards upon itself, the structure easily snapped in half. However, due to the presence of the polycarbonate strengthening layer, Example 1A, as covered by this disclosure, did not snap or break when folded backwards upon itself. As seen in Table 1, the mechanical properties of the polycarbonate in the strengthening layer are significantly higher those properties of the acrylic used in the prism layer.

A comparison of the levels of retroreflection between Example 1A and Comparative Example 1B is provided in Table 2. As shown in the table, the levels of retroreflection are similar indicating minimal internal mixing between the different polymer layers in Example 1A.

TABLE 2

Comparison of Coefficient of Retroreflection (cd/1x/m²)

| Observation Angle | Entrance Angle | Example 1A | Conventional Construction Example 1B | % of Conventional Construction Example 1B |
|---|---|---|---|---|
| 0.2° | −4° | 619 | 653 | 94.7% |
| 0.2° | 30° | 466 | 477 | 97.7% |

The 0° and 90° rotations were averaged in Table 2.

Example 2

Example 2 is another metalized microprismatic retroreflective film and is identical to Example 1A except that the middle layer of the coextruded first laminating film was made from Eastar Copolyester AN014, which is believed to be a polycyclohexylenedimethylene terephthalate copolyester alloy polymer known as PCTA, commercially available from Eastman Chemical of Kingsport, Tenn. As with Example 1A, the thickness of this strengthening layer was approximately 75 microns. The retroreflectivity properties of Example 2 are shown in Table 3.

TABLE 3

Comparison of Coefficient of Retroreflection (cd/1x/m²)

| Observation Angle | Entrance Angle | Example 2 | % of Conventional Construction Example 1B |
|---|---|---|---|
| 0.2° | −4° | 512 | 78.4% |
| 0.2° | 30° | 323 | 67.7% |

The 0° and 90° rotations were averaged in Table 3.

As can be seen in Table 2, the use of PCTA as the strengthening layer results in lower levels of retroreflection compared with the use of polycarbonate in Example 1A. The Vicat softening temperature of AN014 PCTA copolyester alloy is estimated at 172° F., which is lower than the Vicat softening point of the adjacent acrylic in the lower body layer as well as that of the prism layer acrylic. (Note: The Vicat softening point of 172° F. for a 50N load test method was estimated based upon available data for AN014 PCTA where the Vicat softening point was measured at 186° F. for a 10N load.) As such, it is believed that the different polymers of each layer were able to soften and flow and mix together in an undesirable fashion during the manufacturing process, even though the buffer section remained the same thickness as Example 1A. The refractive index of the lower body layer acrylic is 1.49 while the refractive index of the PCTA is 1.54. As such, as these polymers mix together, a cloudiness or haze can form within the film, which could then result in the decrease in retroreflectivity levels.

On the other hand, with the use of polycarbonate as the strengthening layer in Example 1A, it is believed that due to the higher thermal properties, as indicated by the Vicat softening point of 300° F., the polycarbonate did not soften and flow to the same degree as the PCTA during the manufacturing process. Therefore, the polycarbonate is more resistant to mixing with the surrounding acrylic layers and, despite the different refractive index of 1.585 for the polycarbonate, higher levels of retroreflection were maintained.

Example 3

For Example 3, a metalized microprismatic retroreflective film was constructed using the same layers and polymer materials as Example 1A. However, the thickness of the three layers was varied. The lower body layer and the upper body layer were both approximately 30 microns, and the strengthening layer of polycarbonate was approximately 90 microns. Thus, the buffer section was approximately 58 microns (approximately 86% of the microprism height). The sample was difficult to break upon bending the sample back upon itself. Table 4 shows that similar levels of retroreflection were obtained and indicates how different thicknesses can be used for the each of the layers.

TABLE 4

Comparison of Coefficient of Retroreflection (cd/1x/m²)

| Observation Angle | Entrance Angle | Example 3 | % of Conventional Construction Example 1B |
|---|---|---|---|
| 0.2° | −4° | 650 | 99.5% |
| 0.2° | 30° | 482 | 101.0% |

The 0° and 90° rotations were averaged in Table 4.

Example 4A and Comparative Example 4B

Example 4A and Comparative Example 4B demonstrate that retroreflectivity levels decrease when the acrylic buffer section is relatively thin. Both Example 4A and 4B are metalized microprismatic retroreflective constructions.

Example 4A, as described herein, was prepared with a first laminating film consisting of a two-layer coextruded film with a total thickness of approximately 160 microns. The lower-layer of the coextruded film was approximately 80 microns thick and was made from Panlite® L-1250Z polycarbonate resin (commercially available from Teijin Kasei America, Inc. of Norcross, Ga.). This lower-layer of the coextruded film became the strengthening layer. The upper-layer of the coextruded film was approximately 80 microns thick and was made from Acrylite 7N acrylic resin (commercially available from Evonik Cyro, LLC, of Parsippany, N.J.) and contained 15% by weight of an acrylic-rubber impact-modifier additive (EM-600 commercially available from LG Chem, Ltd., of South Korea). This upper-layer became the upper body layer in the metalized retroreflective film construction. Example 4A did not incorporate a lower body layer, and therefore, the land section of the prism layer alone functioned as the buffer section. As mentioned above, the land section has a thickness of approximately 28 microns, which represents approximately 42% of the height of the microprisms. The second laminating film was a 75 micron UV-screening acrylic film commercially available from Aura Optical Systems, L.P. of Fort Worth, Tex. with the product code of AURA® 9127 film, which became a cover layer in the final retroreflective film construction.

Comparative Example 4B is a conventional construction consisting only of acrylic polymers. It was prepared with a first laminating film consisting of a single-layer extruded film of DR-101 impact-modified acrylic resin with a thickness of 150 microns. The second laminating film was the same 75 micron UV-screening acrylic film as Example 4A.

As can be seen in Table 5, the use of a thin buffer section results in a significant decrease in retroreflective properties. In contrast with Example 1A and Example 3, which both contained a much thicker acrylic buffer section, the retroreflective properties relative to the control sample are significantly lower.

TABLE 5

Comparison of Coefficient of Retroreflection (cd/1x/m$^2$)

| Observation Angle | Entrance Angle | Example 4A | Comparative Example 4B (Conventional Construction) | % of Comparative Example 4B |
|---|---|---|---|---|
| 0.2° | −4° | 213 | 1063 | 19.9% |
| 0.2° | 30° | 147 | 800 | 18.3% |

The 0° and 90° rotations were averaged in Table 5.

Example 5A and Comparative Example 5B

Example 5A and Comparative Example 5B demonstrate the improvement in observation angularity with the present disclosure. Both Example 5A and Comparative Example 5B are metalized microprismatic retroreflective sheetings.

Example 5A, as covered by an embodiment of this disclosure, was prepared with the same first laminating film of Example 1A. However, the second laminating film was a 75 micron UV-screening acrylic film commercially available from Aura Optical Systems, L.P. with product code of AURA® 9127 and became the cover layer in the final retroreflective film construction. As with Example 1A, the resulting metalized retroreflective structure was the same as that shown in FIG. 5.

Comparative Example 5B is a conventional construction consisting only of acrylic polymers. It was prepared with a first laminating film consisting of a single-layer extruded film of DR-101 impact-modified acrylic resin with a thickness of 125 microns. The second laminating film was the same 75 micron UV-light screening acrylic film as Example 5A.

Table 6 shows the resulting improvement in observation angularity as a result of the incorporation of the polycarbonate strengthening layer.

TABLE 6

Comparison of Coefficient of Retroreflection (cd/1x/m$^2$)

| Observation Angle | Entrance Angle | Example 5A | Comparative Example 5B (Conventional Construction) | % of Comparative Example 5B (Conventional Construction) |
|---|---|---|---|---|
| 0.33° | −4° | 410 | 303 | 135.3% |
| 0.5° | −4° | 167 | 125 | 133.6% |

The 0° and 90° rotations were averaged in Table 6.

Mechanical Property Testing on Example 5A and Comparative Example 5B

To demonstrate the improvements as provided by the embodiments of the present disclosure, mechanical property testing was conducted on the samples of Example 5A and Comparative Example 5B.

Tensile Break Testing.

Samples of each example were cut to ¼" wide strips. Then, after removing the release liner, the strips were placed in a ChemInstruments TT-1000 Tensile Tester and the grips were separated at a rate of 25 mm/min. Table 7 shows the force required to break both materials. The data demonstrates the improvements achieved through the incorporation of the polycarbonate strengthening layer.

TABLE 7

Force Required to Break

| Example 5A | 15.6 Lbf |
| Comparative Example 5B (Conventional Construction) | 12.7 Lbf |

Values in Table 7 are an average of three samples.

Tensile Tear Testing. Samples of each example were cut to ½" wide strips. Then, after removing the release liner to expose the adhesive, the strips were placed in a ChemInstruments TT-1000 Tensile Tester with the material gently folded back upon itself as shown in FIG. 7. The grips of the tensile tester were then separated at a rate of 25 mm/min to force each sample to tear against itself. Table 8 shows the force required to tear each of the samples. As can be seen from the data, the incorporation of the polycarbonate strengthening layer in Example 5A greatly improves the tear resistance of the retroreflective prismatic film.

TABLE 8

Force Required to Tear

| Example 5A | 7.95 Lbf |
| Comparative Example 5B (Conventional Construction) | 0.99 Lbf |

Values in Table 8 are averages of three samples.

Example 6

Example 6 demonstrates how the improvements to the mechanical properties can be achieved through the use of different polycarbonate materials or through the use of various other polymers as the strengthening layer. In each sample of Example 6, the first laminating film was a 2-layer coextruded film of acrylic and another polymer as outlined in Table 9. The thickness of the first laminating film of each sample was approximately 150 microns with the thickness of the acrylic portion of the first laminating film at approximately 75 microns. For each sample, the acrylic layer of the first laminating film became the lower body layer and was positioned against the acrylic microprism layer in order to increase the total thickness of the buffer section beyond that only provided by the land section of the acrylic prism layer. As such, each sample had a buffer section thickness of approximately 103 microns, equating to a thickness of approximately 154% of the height of the microprisms. The second laminating film for each sample of Example 6 was the same AURA® 9127 UV-screening film of Example 5A. Table 10 lists the thermal and mechanical properties of each of the polymers of each layer. As with other samples, a reflective aluminum coating was applied to each sample through a vacuum-metalization process and a pressure-sensitive adhesive layer and release liner was provided.

Table 11 shows the resulting improvements to tensile strength and tear strength as measured by the test methods of Example 5. Table 11 also provides the coefficient of retroreflection at a −4° entrance angle and 0.2° observation angle. It is believed that the strong reflectivity was maintained because the Vicat softening point of the strengthening layer was sufficiently higher than that of the acrylic in the lower body layer, which is the portion of the buffer layer in contact with the strengthening layer.

TABLE 9

First laminating films of Example 6

| Sample ID | Layer | Polymeric Material |
|---|---|---|
| 6-A | Acrylic Lower Body Layer | Acrypet MF-001 polymethyl methacrylate acrylic resin with 15% by weight of EM-600 acrylic-rubber impact-modifier additive |
|  | Strengthening Layer | Makrolon ET3113 polycarbonate resin |
| 6-B | Acrylic Lower Body Layer | Acrypet MF-001 polymethyl methacrylate acrylic resin with 15% by weight of EM-600 acrylic-rubber impact-modifier additive |
|  | Strengthening Layer | Lexan 101 polycarbonate resin |
| 6-C | Acrylic Lower Body Layer | Acrypet MF-001 polymethyl methacrylate acrylic resin with 8% by weight of EM-600 acrylic-rubber impact-modifier additive |
|  | Strengthening Layer | Panlite ® L-1250WP polycarbonate resin |
| 6-D | Acrylic Lower Body Layer | Acrypet MF-001 polymethyl methacrylate acrylic resin with 15% by weight of EM-600 acrylic-rubber impact-modifier additive |
|  | Strengthening Layer | Tritan FX200 glycol-modified polycyclohexylenedimethylene terephthalate (PCTG) co-polyester resin |
| 6-E | Acrylic Lower Body Layer | Optix CA-1000 impact-modified polymethyl methacrylate acrylic resin |
|  | Strengthening Layer | U-polymer U-8400H resin blend of polyethylene terephthalate polyester and polyarylate |

Acrypet MF-001 polymethyl methacrylate acrylic resin is commercially available from Mitsubishi Rayon Co., Ltd., of Tokyo, Japan. EM-600 acrylic-rubber impact-modifier additive is commercially available from LG Chem, Ltd., of South Korea. Makrolon ET3113 polycarbonate resin is commercially available from Bayer Corporation of Pittsburgh, Pa., USA. Lexan 101 polycarbonate resin is commercially available from SABIC Innovative Plastics of Pittsfield, Mass., USA. Panlite® L-1250WP polycarbonate resin is commercially available from Teijin Kasei America, Inc. of Norcross, Ga., USA. Tritan FX200 glycol-modified polycyclohexylenedimethylene terephthalate (PCTG) co-polyester resin is commercially available from Eastman Chemical of Kingsport, Tenn., USA. Optix CA-1000 impact-modified polymethyl methacrylate acrylic resin is commercially available from Plaskolite West, Inc., of Compton, Calif., USA. The U-polymer U-8400H resin blend of polyethylene terephthalate polyester and polyarylate is commercially available from Unitika, Ltd., of Uji City, Japan.

TABLE 10

Thermal and Mechanical Properties of Polymeric Materials of Example 6

| Sample ID | Layer | Refractive Index | Vicat Softening Point (° F.) | Notched Izod Impact Strength | Tensile Strength (psi) |
|---|---|---|---|---|---|
| Samples 6A-6E | Prism Layer: Optix CA-1000 acrylic | 1.49 | 208° F. | 66 J/m | 6,510 psi |
| 6A | Lower Body Layer: Acrylpet MF-001 acrylic | 1.49 | 192° F. | N/A | 9,570 psi |
|  | Strengthening Layer: Makrolon ET3113 polycarbonate | 1.587 | 298° F. | 640 J/m | 10,200 psi |
| 6B | Lower Body Layer: Acrylpet MF-001 acrylic | 1.49 | 192° F. | N/A | 9,570 psi |
|  | Strengthening Layer: Lexan 101 polycarbonate | 1.586 | 291° F. | 560 J/m | 10,200 psi |
| 6C | Lower Body Layer: Acrylpet MF-001 acrylic | 1.49 | 192° F. | N/A | 9,570 psi |
|  | Strengthening Layer: Panlite L-1250WP polycarbonate | 1.585 | 300° F. | 854 J/m | 11,600 psi |
| 6D | Lower Body Layer: Acrylpet MF-001 acrylic | 1.49 | 192° F. | N/A | 9,570 psi |
|  | Strengthening Layer: FX200 PCTG Copolyester | 1.54 | 232° F. | 854 J/m | 8,300 psi |
| 6E | Lower Body Layer: Optix CA-1000 acrylic | 1.49 | 208° F. | 66 J/m | 6,510 psi |
|  | Strengthening Layer: U-8400H polyarylate blend |  | 282° F. | 69 J/m | 9,140 psi |

The Vicat softening point of CA-1000 is estimated at 208° F. for a 50N test methodology based upon available data where the Vicat softening point has been measured at 227° F. using a 10N load. The Notched Izod impact strength of ET3113 is estimated at 640 J/m based upon available data where the Notched Izod impact strength was measured at 80 kJ/m2 using the alternative ISO 180 test method. The Notched Izod impact strength of Lexan 101 is estimated at 560 J/m based upon available data where the Notched Izod impact strength was measured at 70 kJ/m2 using the alternative ISO 180 test method. The Vicat softening point of U-8400H is estimated at 282° F. for a 50N test methodology based upon available data where the Vicat softening point has been measured at 300° F. using a 10N load.

TABLE 11

Mechanical Properties and Coefficient of Retroreflection of Example 6

| Sample ID | Force Required to Break | Force Required to Tear | Coefficient of Retroreflection (cd/1x/m²) |
|---|---|---|---|
| 6-A | 16.7 Lbf | 5.75 Lbf | 872 |
| 6-B | 16.5 Lbf | 3.28 Lbf | 892 |
| 6-C | 16.7 Lbf | 4.44 Lbf | 1118 |
| 6-D | 13.4 Lbf | 1.66 Lbf | 871 |
| 6-E | 15.5 Lbf | 2.36 Lbf | 640 |

Example 7

Example 7 shows how a range of different thicknesses can be used for the buffer section and strengthening layer while still maintaining improved mechanical properties and strong levels of retroreflection. With the exception of the composition and thickness of the first laminating film, each sample in Example 7 was prepared as outlined in Example 6. For Example 7, the first laminating film for each sample consisted of a 2-layer extruded film containing an acrylic layer made from Optix CA-1000 impact-modified polymethyl methacrylate acrylic resin, which became a portion of the buffer section as the lower body layer, and a polycarbonate layer to ultimately function as the strengthening layer made from Panlite L-1250WP. In each sample, the thickness of the different layers was varied as shown in Table 12, which resulted in a range of thicknesses for the buffer section of each sample. The mechanical properties and levels of retroreflection are shown in Table 13. All samples were again evaluated using the test methods outlined in Example 5.

TABLE 12

Approximate Thicknesses of Example 7

| Sample ID | Microprism Height | Acrylic Lower Body Layer Thickness | Resulting Buffer Section Thickness | % Buffer Section Thickness of Microprism Height | Polycarbonate Strengthening Layer Thickness |
|---|---|---|---|---|---|
| 7-A | 67 μm | 70 μm | 98 μm | 146% | 30 μm |
| 7-B | 67 μm | 50 μm | 78 μm | 116% | 50 μm |
| 7-C | 67 μm | 30 μm | 58 μm | 87% | 70 μm |
| 7-D | 67 μm | 122 μm | 150 μm | 223% | 52 μm |
| 7-E | 67 μm | 88 μm | 103 μm | 154% | 87 μm |
| 7-F | 67 μm | 52 μm | 80 μm | 119% | 122 μm |
| 7-G | 67 μm | 140 μm | 168 μm | 251% | 60 μm |
| 7-H | 67 μm | 100 μm | 128 μm | 191% | 100 μm |
| 7-I | 67 μm | 60 μm | 88 μm | 131% | 100 μm |

TABLE 13

Mechanical Properties and Coefficient of Retroreflection of Example 7

| Sample ID | Force Required to Break | Force Required to Tear | Coefficient of Retroreflection (cd/1x/m²) |
|---|---|---|---|
| 7-A | 12.4 Lbf | 1.50 Lbf | 900 |
| 7-B | 13.2 Lbf | 2.41 Lbf | 1081 |
| 7-C | 13.2 Lbf | 5.26 Lbf | 1196 |
| 7-D | 15.0 Lbf | 2.98 Lbf | 849 |
| 7-E | 16.2 Lbf | 6.51 Lbf | 1053 |
| 7-F | 16.8 Lbf | 8.71 Lbf | 1099 |
| 7-G | 15.4 Lbf | 3.61 Lbf | 1061 |
| 7-H | 17.3 Lbf | 4.79 Lbf | 1043 |
| 7-I | 18.1 Lbf | 11.94 Lbf | 1012 |

As Tables 12 and 13 show, a range of different mechanical properties can be obtained in the final retroreflective film construction by varying the thickness of the strengthening layer relative to the acrylic lower body layer and acrylic prism layer. With each sample, strong retroreflectivity levels can still be maintained. Samples with thicker strengthening layer sections relative to the acrylic lower body layer result in retroreflective film structures with stronger mechanical properties.

Those skilled in the art to which this application relates will appreciate that other and further additions, deletions, substitutions and modifications may be made to the described embodiments.

What is claimed is:

1. A multi-layer microprismatic retroreflective film, comprising:
    a prism layer including an acrylic polymeric material and containing microprisms;
    a strengthening layer made from a polymeric material selected from the group consisting of polycarbonate, polyester, copolyester polymeric materials, and blends thereof;
    an upper body layer including an acrylic polymeric material; and
    a buffer section including acrylic polymeric material located between said microprisms of said prism layer and said strengthening layer, wherein:
        said buffer section includes a separately provided acrylic lower body layer;
        said acrylic polymeric materials of said prism layer, said upper body layer, and said lower body layer have a Vicat softening point greater than about 150° F.; and
        said strengthening layer is located between said upper body layer and said lower body layer.

2. The film as recited in claim 1 wherein said buffer section includes a land section.

3. The film as recited in claim 1 wherein said lower body layer has a thickness of less than about 140 microns.

4. The film as recited in claim 1 wherein an Izod notched impact strength of said polymeric material of said strengthening layer is at least 100 J/m greater than that of said acrylic polymeric material of said prism layer.

5. The film as recited in claim 1 wherein an Izod notched impact strength of said polymeric material of said strengthening layer is at least 400 J/m greater than that of said acrylic polymeric material of said prism layer.

6. The film as recited in claim 1 wherein a tensile strength at break of said polymeric material of said strengthening layer is at least 2,000 psi greater than that of said acrylic polymeric material of said prism layer.

7. The film as recited in claim 1 wherein a tensile strength at break of said polymeric material of said strengthening layer is at least 3,500 psi greater than that of said acrylic polymeric material of said prism layer.

8. The film as recited in claim 1 wherein a Vicat softening point of said strengthening layer is at least 20° F. greater than a Vicat softening point of said acrylic polymeric material in said lower body layer.

9. The film as recited in claim 1 wherein a Vicat softening point of said strengthening layer is at least 50° F. greater than a Vicat softening point of said acrylic polymeric material in said lower body layer.

10. The film as recited in claim 1 wherein said strengthening layer comprises a polycarbonate polymeric material.

11. The film as recited in claim 1 wherein a thickness of said buffer section is at least 50% of a height of said microprisms of said prism layer.

12. The film as recited in claim 1 wherein a thickness of said buffer section ranges from about 20 microns to about 400 microns.

13. The film as recited in claim 1 further comprising a cap layer.

14. The film as recited in claim 13 wherein said cap layer comprises an acrylic polymeric material.

15. The film as recited in claim 1 wherein said lower body layer has a thickness of less than about 100 microns.

16. The film as recited in claim 1 wherein said lower body layer has a thickness of less than about 50 microns.

17. The film as recited in claim 1 wherein said microprisms have a reflective coating on lateral faces thereof, said reflective coating selected from the group consisting of aluminum, nickel, and silver.

18. The film as recited in claim 1 wherein said film has a force required to tear greater than about 1.5 LBf.

19. The film as recited in claim 1 wherein said film has a force required to tear greater than about 3.0 LBf.

20. The film as recited in claim 1 wherein said film has a force required to tear greater than about 13.0 LBf.

21. The film as recited in claim 1 wherein said film has a force required to tear greater than about 15.0 LBf.

22. A method of manufacturing a multi-layer microprismatic retroreflective film, comprising:
   forming a prism layer containing microprisms from an acrylic polymeric material;
   separately forming a first laminating film including a strengthening layer having a polymeric material different from said acrylic polymeric material and including an acrylic lower body layer; and
   bonding said first laminating film to said prism layer, said bonding forming a buffer section having acrylic polymeric material between said microprisms and said strengthening layer.

23. The method as recited in claim 22 wherein said buffer section includes a land section.

24. The method as recited in claim 22 wherein lower body layer has a thickness of less than about 140 microns.

25. The method as recited in claim 22 wherein said first laminating film includes an upper body layer wherein said strengthening layer is located between said upper body layer and said lower body layer.

26. The method as recited in claim 22 wherein said forming said first laminating film is carried out by coextruding said strengthening layer and said lower body layer.

27. The method as recited in claim 22 wherein said lower body layer has a thickness of less than about 100 microns.

28. The method as recited in claim 22 wherein said lower body layer has a thickness of less than about 50 microns.

29. The method as recited in claim 22 wherein said microprisms have a reflective coating on lateral faces thereof, said reflective coating selected from the group consisting of aluminum, nickel, and silver.

* * * * *

UNITED STATES PATENT AND TRADEMARK OFFICE
CERTIFICATE OF CORRECTION

PATENT NO. : 9,746,591 B2
APPLICATION NO. : 14/200373
DATED : August 29, 2017
INVENTOR(S) : Siyao Lu et al.

It is certified that error appears in the above-identified patent and that said Letters Patent is hereby corrected as shown below:

In the Specification

In Column 6, Line 9, after "section" please insert --35--

In Column 8, Line 64, after "The reflective coating" please insert --71--

Signed and Sealed this
Twentieth Day of February, 2018

Andrei Iancu
*Director of the United States Patent and Trademark Office*